United States Patent
Prange et al.

(10) Patent No.: US 6,480,542 B1
(45) Date of Patent: Nov. 12, 2002

(54) METHOD FOR DECODING COMPRESSED VIDEO DATA WITH A REDUCED MEMORY REQUIREMENT

(75) Inventors: Stefan Prange, München (DE); Heribert Geib, Grafing (DE); Bernard Hammer, Pfaffing (DE); Jürgen Pandel, Feldkirchen-Westerham (DE)

(73) Assignee: Siemens Aktiengesellschaft, Munich (DE)

( * ) Notice: Subject to any disclaimer, the term of this patent is extended or adjusted under 35 U.S.C. 154(b) by 768 days.

(21) Appl. No.: 08/793,356

(22) PCT Filed: Aug. 18, 1995

(86) PCT No.: PCT/DE95/01093
§ 371 (c)(1),
(2), (4) Date: Feb. 21, 1997

(87) PCT Pub. No.: WO96/06506
PCT Pub. Date: Feb. 29, 1996

(30) Foreign Application Priority Data

Aug. 24, 1994 (DE) .......................................... 44 30 030

(51) Int. Cl.⁷ ................................................. H04N 7/18
(52) U.S. Cl. .............................. 375/240.15; 375/240.13
(58) Field of Search ................................ 348/717, 718, 348/714, 715, 699, 700, 411, 416, 410, 415, 426, 423, 407, 404, 396, 390, 385, 384, 845.1, 845.2; 382/56; 375/240.12–240.17

(56) References Cited

U.S. PATENT DOCUMENTS

| 5,502,494 A | * | 3/1996 | Auld ........................... 348/426 |
| 5,581,302 A | * | 12/1996 | Ran et al. ................... 348/416 |
| 5,623,311 A | * | 4/1997 | Phillips et al. .............. 348/416 |
| 5,717,461 A | * | 2/1998 | Hoogenboom .............. 348/394 |
| 5,777,677 A | * | 7/1998 | Linzer et al. ................ 348/397 |
| 5,825,419 A | * | 10/1998 | Mishima et al. ............ 348/402 |

FOREIGN PATENT DOCUMENTS

| EP | 0 572 046 A1 | 1/1993 |
| EP | 0 553 515 A2 | 4/1993 |
| EP | 0 576 289 A2 | 12/1993 |
| EP | 0 598 904 A1 | 6/1994 |

OTHER PUBLICATIONS

D. J. Le Gall, "The MPEG video compression algorithm", Signal Processing: Image Communication 4 (1992), pp. 129–140.

A. Knoll, International Standard ISO/IEC 11172-2: Coding of moving pictures and associated audio, ISO/MPEG, 1993(E), pp. 1–33.

Draft International Standard ISO/IEC 13818-2: Generic Coding of Moving Pictures and Associated Audio, Mar. 25, 1994, pp. 1–201.

M. Bierling, "Displacement Estimation by Hierarchical Blockmatching", 3rd SPIE Symposium on Visual Communication, Nov. 1988, pp. 942–951.

\* cited by examiner

*Primary Examiner*—Andy Rao
(74) *Attorney, Agent, or Firm*—Schiff Hardin & Waite

(57) ABSTRACT

For the purpose of bidirectional movement-compensated interpolation, it is proposed, when decoding compressed video sequences, completely to decode only one of the two reference frames. Only those respective picture areas of the other reference frame are decompressed which overlap with the picture area to be determined of the interpolated frame, taking account of a displacement corresponding to the movement compensation. As a result, a considerable reduction in the memory requirement of the decoding hardware is possible.

3 Claims, 4 Drawing Sheets

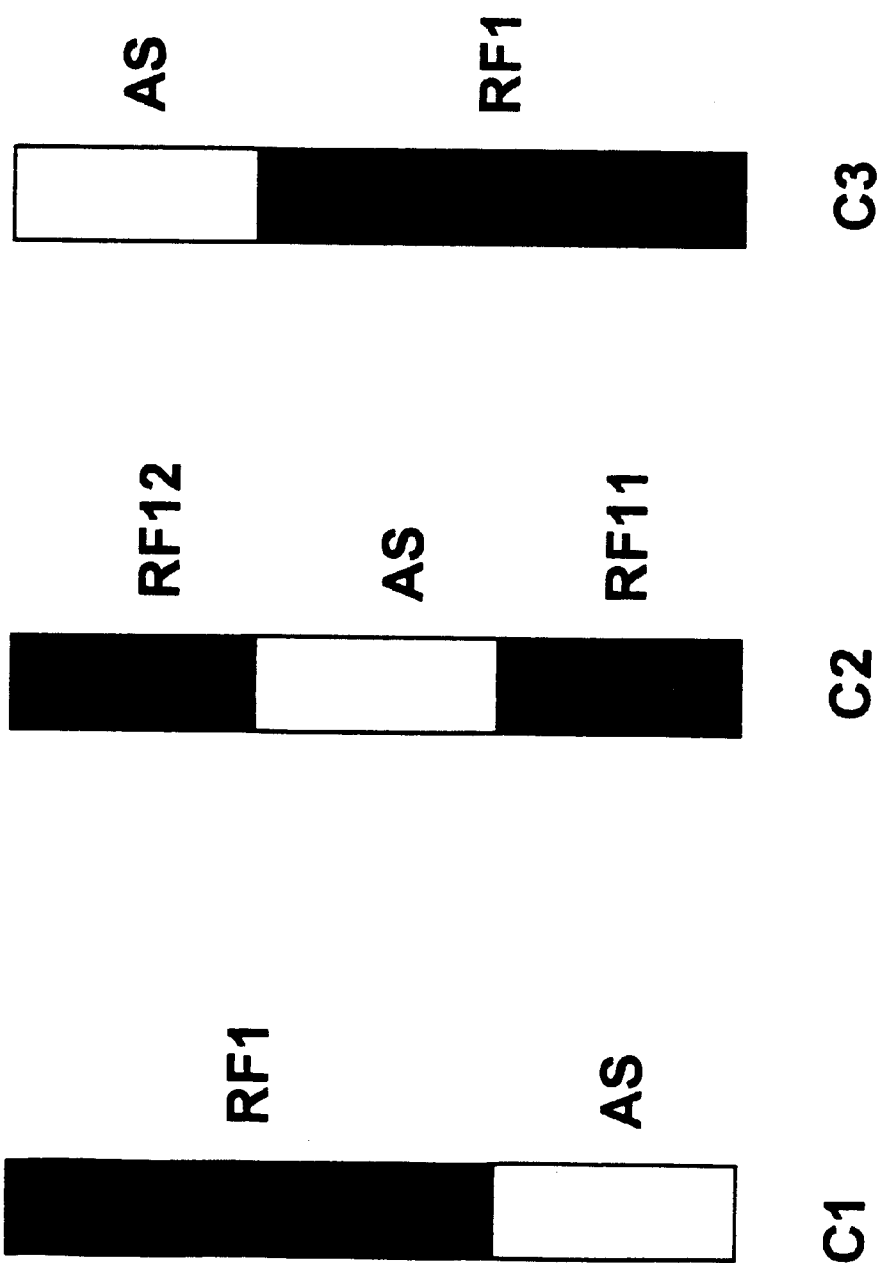

METHOD FOR DECODING COMPRESSED VIDEO DATA WITH A REDUCED MEMORY REQUIREMENT

BACKGROUND OF THE INVENTION

The present standards for compressing video data, for example ISO/IEC 11172-2 (MPEG1) or ISO/IEC 13818-2 (MPEG2), combine the principles of prediction and transformation coding to produce so-called hybrid coding. The prediction is carried out here with the aid of a so-called differential pulse code modulation loop (DPCM loop), which generates differential frames by subtracting predicted video data from the original video data to be coded. The local correlations remaining in these differential frames between adjacent pixels are utilized with the aid of suitable transformation, preferably with the is aid of discrete cosine transformation (DCT). The transformation coefficients produced in this case are subsequently subjected to quantization and transmitted after entropy coding. The fundamental mode of operation of this compression method is known to the person skilled in the art from various publications, for example from D. J. Le Gall, "The MPEG video compression algorithm", Signal Processing: Image Communication 4 (1992) 129–140. International Standard ISO/IEC 11172-2: Coding of moving pictures and associated audio, ISO/MPEG, 1993(E). Draft International Standard ISO/IEC 13818-2: Generic coding of moving pictures and associated audio, Mar. 25, 1994.

In order to improve the quality of the prediction in those picture areas in which moving objects occur, use is made of so-called movement-compensated prediction. The principles of the movement estimation required for this purpose and their application for the movement-compensated prediction are known to the person skilled in the art, for example from M. Bierling, "Displacement estimation by hierarchical block matching", 3rd SPIE Symp. on Visual Commun., Cambridge, Mass., November 1988. Draft International Standard ISO/IEC 13818-2: Generic coding of moving pictures and associated audio, Mar. 25, 1994. So-called movement-compensated interpolation is provided in addition to the movement-compensated prediction in the case of the said standardized methods for compressing video data. In connection with MPEG terminology, movement-compensated interpolation is also designated as bidirectional prediction. However, since this designation may easily be confused with movement-compensated prediction, the term movement-compensated interpolation is preferred in the context of this application. The picture quality is decisively improved by the use of movement-compensated interpolation, since it allows a satisfactory treatment of masked picture areas and contributes to improved noise suppression.

A distinction is made between three differently coded types of frames. So-called I-frames are transmitted without any chronological prediction, but rather are subjected only to intra-frame coding, preferably DCT coding with subsequent quantization of the transformation coefficients. In the context of this patent application, "intra-frame coding" is to be understood quite generally as any method which is suitable for treating local correlations in video data. The so-called P-frames are predicted with the aid of the DPCM loop from chronologically preceding I-frames or P-frames (forward prediction). The difference between the predicted frame and the actual frame is subjected to inter-frame coding, preferably DCT transformation with subsequent quantization of the transformation coefficients. So-called B-frames, which are also designated as "interpolated frames" in the context of the present patent application, are chronologically situated between an I-frame and a P-frame or between two P-frames. B-frames are determined by means of "bidirectional" movement-compensated interpolation from a chronologically preceding I- or P-frame and a chronologically succeeding I- or P-frame. In this case, the expressions "chronologically", "succeeding" and "preceding" do not refer to the order in which these frames are transmitted in the data stream of compressed frames, rather they refer to the order in which these frames are recorded/reproduced. In the same way as P-frames, B-frames, too, are coded in the form of quantized transformation coefficients of a differential frame.

In the case of currently known implementations, the reconstruction of a B-frame by means of movement-compensated interpolation from a chronologically preceding I- or P-frame and a chronologically succeeding I- or P-frame necessitates the provision of the two reference frames (which are also occasionally designated as support frames in the literature) in fully decoded form. Therefore, two fully decoded reference frames (i- or P-frames) have to be stored in a frame store in the case of the methods belonging to the prior art for carrying out movement-compensated interpolation. The re-interlacing during the video output requires further storage capacity. The overall required memory is a decisive cost factor in the hardware used for decoding and encoding. A reduction in the storage capacity required is therefore desirable.

SUMMARY OF THE INVENTION

The invention is based on the object of specifying a method for decoding compressed video data with a reduced memory requirement. This object is achieved according to the invention by a method for decoding compressed video data with a reduced memory requirement In this case, only memory space taken up by one fully decoded first reference frame and one compressed second reference frame is required for storing the reference frame data when carrying out interpolation. A reduction in the memory requirement by, for example, at least 2.6 Mbits can be expected in a typical application (MPEG2/Main Level/Main Profile) with an assumed typical channel data rate of 10 Mbit/s. This reduction in the necessary storage capacity means that integration of the codec on a chip is substantially facilitated or even becomes possible in the first place, and the implementation becomes decisively more economical thereby. However, a prerequisite for this is an adequately fast hardware logic unit for the decoding/encoding or, if this is not the case, multiple replication of the corresponding hardware logic circuits.

The core of the invention is not to store the uncompressed data for the second reference frame but rather to keep in store only the compressed data in the (correspondingly enlarged) input buffer of the decoder. For the purpose of reconstructing a B-frame between two P- or I-frames (generally between two reference frames), only those picture areas which are instantaneously required for the video output are decoded from the compressed data stream. In the case of MPEG, these are, for example, those blocks of the second reference frame which overlap with the macroblock to be determined of the interpolated frame, taking into account a displacement corresponding to the movement compensation. In the example of frame prediction, 9 blocks each of 8 times 8 luminance pixels of the first reference frame are required for the luminance pixels of a macroblock to be decoded of the second reference frame.

The area of application of the invention includes not only purely decoding but also encoding video data, because an encoder which operates in accordance with the principle of prediction by DPCM coding always contains a decoder, which decodes the coded data again, as a result of which it becomes possible in the first place to calculate differential frames in a DPC loop D. J. Le Gall, "The MPEG video compression algorithm", Signal Processing: Image Communication 4 (1992) 129–140.

An advantageous embodiment of the invention is one in which, for the purpose of reconstructing and outputting the second reference frame, after the interpolated frames are output, the memory space provided for the output of these frames is initially used to store the second reference frame in an uncompressed form.

It is further advantageous if
after this the store for the first reference frame is used to store the remainder of the second reference frame in an uncompressed form,
the remainder of the store for the first reference frame which is no longer required is used as an output memory for the succeeding interpolated frame, and if
the memory area which has now accommodated the completely uncompressed second reference frame contains the first reference frame for the decoding of the chronologically succeeding interpolated frames.

The invention can also be implemented with the aid of a circuit arrangement for decoding compressed video data, for example having the features according to one of the claims.

The invention is in no way restricted to the area of transformation coding, and is in no way whatsoever restricted to the area of block-by-block DCT coding. Since no preconditions have to be made concerning the type of intra-frame coding, the invention can be applied in connection with virtually all known methods, or methods to be developed in future, of intra-frame coding, for example also in connection with so-called quadtree coding or in connection with methods based on object segments. The decisive prerequisite for the applicability of the invention is the "bidirectional" movement-compensated interpolation.

BRIEF DESCRIPTION OF THE DRAWINGS

The features of the present invention which are believed to be novel, are set forth with particularity in the appended claims. The invention, together.with further objects and advantages, may best be understood by reference to the following description taken in conjunction with the accompanying drawings, in the several Figures of which like reference numerals identify like elements, and in which:

The invention will be explained in more detail below using preferred exemplary embodiments and with the aid of the figures.

FIG. 4 diagrammatically shows the division of the frame store in accordance with the method according to the invention.

In these figures, the reference symbols used represent the following terms:

CDBS Bit stream of the compressed video data
BF Buffer
INVQ Inverse quantization
DCTC Transformation coefficients, DCT coefficients
IDCT Inverse DCT
MD Movement information, movement vectors
BSP Frame store
RBv Reference blocks for forward prediction
RBr Reference blocks for backward prediction
BSYN Picture synthesis
DCMB Decoded macroblock
AS Video output memory (for re-interlacing)
YUVRGB YUV/RGB conversion
MON Monitor
HA Header evaluation
VRLD Variable length/run length decoding
MC Movement compensation
ZGT Access table to a memory area
RB1, 2 Reference frames (support frames)
IB Interpolated frame
RF1 Reference frame 1
RF11 First half of the reference frame 1
RF12 Second half of the referenceframe 1

DESCRIPTION OF THE PREFERRED EMBODIMENTS

A The coding of frame sequences for the purpose of data compression takes place in accordance with a hybrid-DCT method, that is to say the utilization of the chronological correlation of the frames takes place by means of chronological movement-compensated prediction, while the utilization of the local correlation is given by the discrete cosine transformation (DCT). This DCT is carried out on blocks of 8 times 8 pixels: in each case 4 blocks of luminance Y, 1 block of chrominance U and 1 block of chrominance V are combined to form a macroblock, with the result that such a macroblock covers 16 times 16 pixels in a color picture. Macroblocks of a block line can, but do not have to, be combined to form so-called slices [2], [3]. Common items of information for these macroblocks are contained in the slice header.

A series of video frames is preferably split into groups of pictures (GOP), which may include, for example, 12 frames. Each group of pictures begins with an intra-frame-coded picture—also called I-frame. Only the local correlation is used for the data compression of these frames; there is no recourse to previous frames and also no anticipation of future frames. This I-frame is used as a reference frame for a future, chronologically predicted P-frame. This prediction is carried out with the aid of the movement compensation. The chronological prediction error is transmitted as an intra-frame-coded differential frame. A P-frame is used, in turn, as a reference frame for the prediction of the next P-frame.

Figure 1:
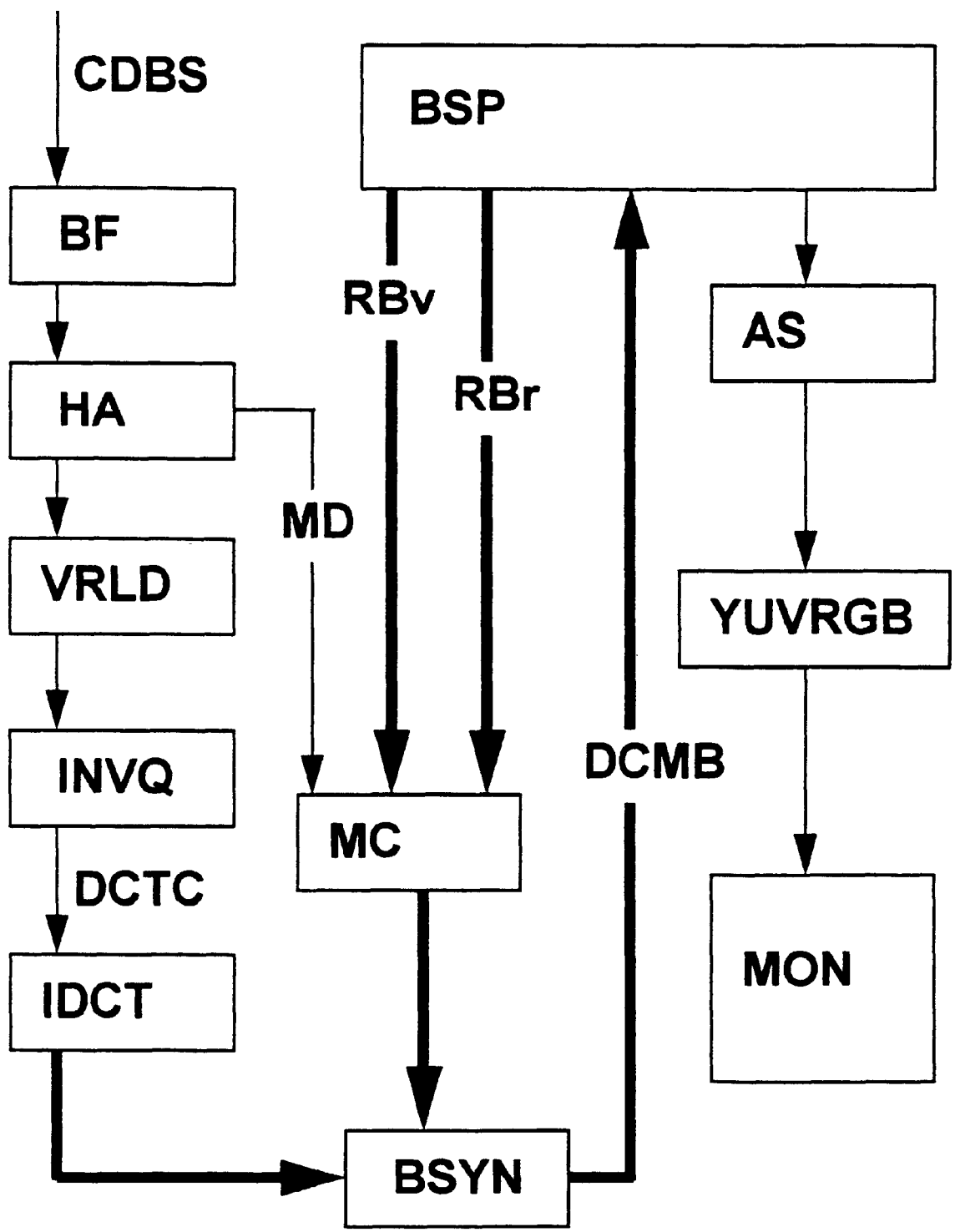
FIG. 1 diagrammatically shows a block diagram of an MPEG2 video decoder, for example for digital television.

As shown in FIG. 1, for the purpose of decoding a bit stream of compressed video data, this bit stream CDBS is initially loaded into a buffer BF which, in the case of MPEG2, has a minimum size of, for example, 1.75 Mbits and from which the data can be read at a variable rate controlled by the decoder. The frames are present in this input data stream, for example, in the order

I1, P4, B2, B3, P7, B5, B6, P10, B8, B9, I13, B11, B12, P16, B14, ...

the letter representing the type of frame and the associated number representing the position in the decoded bit stream, that is to say specifying the order in which the frames have to be showed.

That is to say the B-frames B2 and B3 (inter-polated frames), which belong to the instants 2 and 3, respectively, and are to be decoded by means of inter-polation from the reference frames I1 and P4, chronologically follow, during transmission, the reference frames which belong to the recording instants 1 and 4. When reference is made in the context of this patent application to chronologically preceding or chronologically succeeding frames, what is always meant, however, is the order of recording/reproduction instants in which, for example, the P-frame P4 follows the B-frames B2 and B3.

As is shown using Table 1 below, two frame stores are adequate for decoding the coded data stream, if the memory allocation below is used:

In this case, operations for format conversions (interlaced/progressive, block format/line format) in the video output memory were initially not taken into account.

TABLE 1

Allocation of the frame stores in the prior art

| Step | Input | Decoding of | Contents of frame store A | Contents of frame store B | Output of |
|---|---|---|---|---|---|
| 1 | $I_1$ coded | $I_1$ | $I_1$ is written in | | |
| 2 | $P_4$ coded | $P_4$ | $I_1$ is read out | $P_4$ is written in | $I_1$ decoded |
| 3 | $B_2$ coded | $B_2$ | Accesses to $I_1$ | Accesses to $P_4$ | $B_2$ decoded |
| 4 | $B_3$ coded | $B_1$ | Accesses to $I_1$ | Accesses to $P_4$ | $B_3$ decoded |
| 5 | $P_7$ coded | $P_7$ | $P_7$ is written in | $P_4$ is read out | $P_4$ decoded |
| 6 | $B_5$ coded | $B_5$ | Accesses to $P_7$ | Accesses to $P_4$ | $B_5$ decoded |
| 7 | $B_6$ coded | $B_6$ | Accesses to $P_7$ | Accesses to $P_4$ | $B_6$ decoded |
| 8 | $P_{10}$ coded | $P_{10}$ | $P_7$ is read out | $P_{10}$ is written in | $P_7$ decoded |
| 9 | $B_8$ coded | $B_8$ | Accesses to $P_7$ | Accesses to $P_{10}$ | $B_8$ decoded |
| 10 | $B_9$ coded | $B_9$ | Accesses to $P_7$ | Accesses to $P_{10}$ | $B_9$ decoded |
| 11 | $I_{13}$ coded | $I_{13}$ | $I_{13}$ is written in | $P_{10}$ is read out | $P_{10}$ decoded |
| 12 | $B_{11}$ coded | $B_{11}$ | Accesses to $I_{13}$ | Accesses to $P_{10}$ | $B_{11}$ decoded |
| 13 | $B_{12}$ coded | $B_{12}$ | Accesses to $I_{13}$ | Accesses to $P_{10}$ decoded | $B_{12}$ |
| 14 | $P_{16}$ coded | $P_{16}$ | $I_{13}$ is written in | $P_{16}$ is read out | $I_{13}$ decoded |
| 15 | $B_{14}$ coded | $B_{14}$ | Accesses to $I_{13}$ | Accesses to $P_{16}$ | $B_{14}$ decoded |

Figure 2:
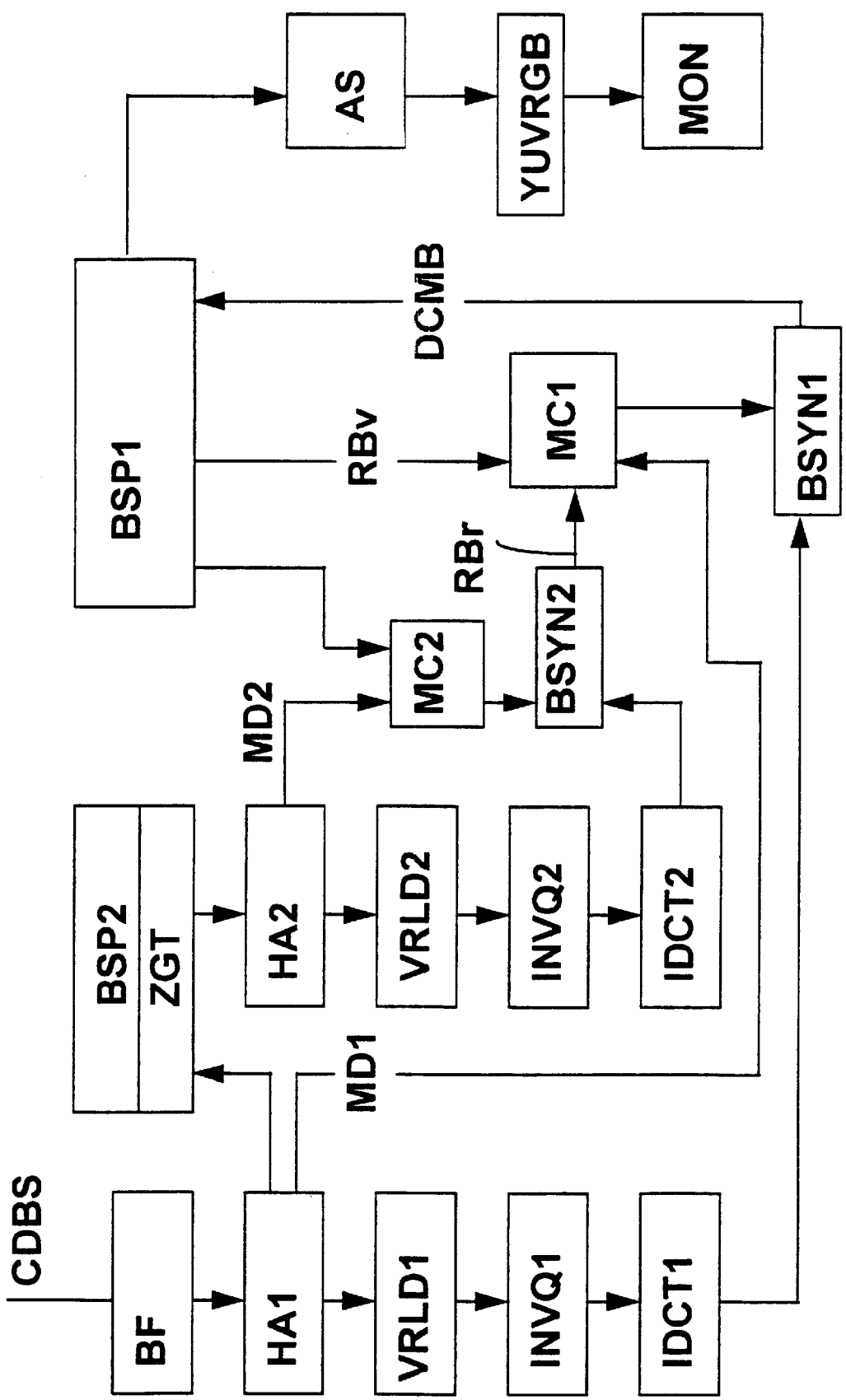
FIG. 2 diagrammatically shows a block diagram of an MPEG2 decoder with a reduced frame store requirement in accordance with the present invention.

The invention will now show a way of further reducing the memory requirement, with the result that fewer than two complete frame stores are required for carrying out the bidirectional interpolation. In the case of the methods according to the prior art, the data stream contained in the buffer BF is—as shown in FIG. 1—evaluated by a device HA for header evaluation to the extent that individual macroblocks of all the coded frames can subsequently be subjected to intra-frame decoding, preferably in the form of inverse quantization INVQ and inverse transformation IDCT. In accordance with the present invention, a respective reference frame is kept—as shown in FIG. 2—in compressed form in a frame store BSP2, which is written to and read from via an access table ZGT. From these descriptions, it is clear to the person skilled in the art that the store BSP1 does not necessarily have to be physically different from the memory areas of the buffer BF, but that the store BSP2 may also be merely a logically different form of access to the data of the buffer BF. However, the respective other reference frame is used, after having been completely decoded, for the picture synthesis BSYN1,2 and is stored in uncompressed form in a complete frame store BSP1.

A P-frame Pi is always predicted unidirectionally (forwards) from the preceding I- or P-frame (I(i−b−1) or P(i−b−1)), b designating the number of B-frames between two reference frames. It is therefore sufficient to store the first reference frame in an uncompressed form if sufficient computing power is available to calculate in real time the areas, required for interpolation, of the missing P-frame Pi. This P-frame Pi can then remain compressed until it has to be output itself and serves as a basis for the following P-frame P(i+b+1) (see FIG. 2). An I-frame I(i) can also remain compressed until it has to be output itself and serves as a basis for the following P-frame.

Figure 3:
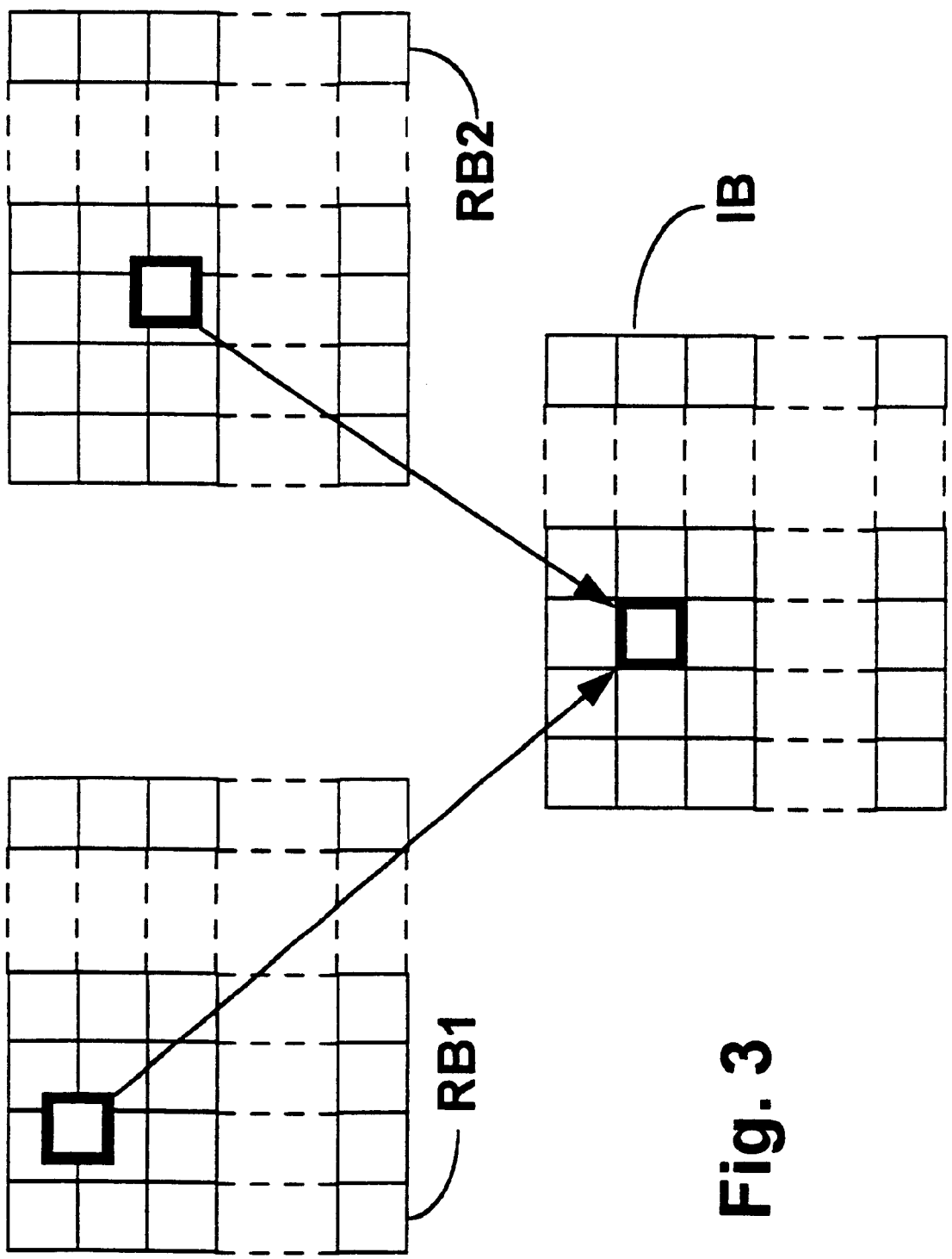
FIG. 3 diagrammatically shows the relationship between a macroblock of a B-frame and the corresponding macroblocks, displaced by movement compensation, of the associated reference frames.

The movement information for the prediction is specified for individual macroblocks. A macroblock consists of 16 times 16 luminance pixels plus 2 times 8 times 8 chrominance pixels in the so-called 4:2:0 format. If only one macroblock in the B-frame contains a movement vector with regard to the P-frame Pi, then the associated macroblocks of the P-frame must be decompressed for the movement compensation. The movement vector (for example in the case of frame prediction) will generally refer to a 16 times 16 block, which does not have to be situated in the raster of the original macroblocks but rather may be displaced in the half-pixel raster (FIG. 3). Therefore, four macroblocks (or at least 9 blocks each of 8 times 8 luminance pixels plus two times 4 blocks each of 8 times 8 chrominance pixels) normally have to be completely decompressed for the backward prediction.

Therefore, the necessary computing speed is four times higher in the case of backward prediction compared with conventional MPEG decoding described at the beginning (in the case of frame prediction). When decompressing these four macroblocks, access is made to four 16 times 16 frame blocks (or in the worst case, for 16 times 8 prediction in the field mode and for half-pixel accuracy: eight 17 times 9 picture areas). This access is not problematic for the computing power, since the corresponding video data are stored in an uncompressed form. Moreover, a frame block of the first reference frame (I(i−b−1) or P(i−b−1)) stored in an uncompressed form must be read for the forward prediction. The necessary memory bandwidth is increased thereby to approximately 750 Mbit/s, since a 16 times 16 frame block for the forward prediction and four 16 times 16 frame blocks for the backward prediction normally have to be read for each macroblock. This bandwidth problem may be alleviated by integration of the memory on the processor chip.

A prerequisite for the application of the invention is the possibility of direct access to individual frame blocks of the reference frames. Therefore, the compressed data must be evaluated (HA) with regard to the addresses of the macroblocks in the memory. These addresses must be stored in the form of a table (ZGT). In addition, any existing mutually differential codings of the macroblocks must be reversed.

As soon as the P-frame Pi has to be output, it is also stored in an uncompressed form. Therefore, it is necessary that enough frame store memory is made available to ensure that no video data, required for the decompression, of the first reference frame are overwritten too early. Therefore, at least the maximum possible search area to which the movement vectors can be referenced must remain in the store. If the movement vector fields of the P-frame Pi is evaluated in advance, it is even possible to reduce the necessary memory space even further as a result of the fact that areas which are no longer required are overwritten early. In this case, the access table ZGT can, in turn, be used for decompression of the macroblocks in any order. It is emphasized again that the memory requirement for the compressed reference frame BSP2 can be regarded, together with the buffer BF which is present anyway, as a unit in the sense that the compressed data do not have to be kept additionally in a further physical store BSP2, but that the store BSP2 may also represent merely a logic form of access to data stored anyway in the buffer BF.

For the purpose of reconstructing a B-frame between two P- or I-frames (generally between two reference frames) only those picture areas which are instantaneously required for the video output are decoded from the compressed data stream. Since the video data are produced in a block-by-block manner, but are reproduced in a line-by-line manner, the output memory must be able to accommodate at least two block lines. In order, moreover, to be able to output pictures which are coded as frames using the line interlacing method, that is to say as two fields, a field store must be provided (re-interlacing).

In comparison with the currently known methods, according to the present invention both the B-frame data and the data of the following reference frame must be decoded in the case of every B-frame, therefore either a faster decoding hardware is necessary, or this hardware must be multiply replicated for parallel processing. However, the additional chip surface area required in the case of duplicating the decoding hardware is, possibly, less than the gain in chip surface area as a result of the reduction in the required storage capacity.

When using the currently known methods for decoding, a total storage capacity of approximately 16 Mbits is required for the output memory and input buffer in order to store the reference frames in the CCIR 601 format. Using the method according to the present invention, the maximum requirement is reduced to 4.75 Mbits for the first reference store, 2 Mbits for the input buffer including 600 kbits for an additional overflow reserve, 1.75 Mbits for the compressed reference frame, 34 kbits for the access table and 270 kbits for the storage of two macroblock lines in the output memory. Therefore, it is possible to reduce the memory requirement to approximately 11.6 Mbits or less with the aid of the method described here.

The procedure for decoding can be described as follows (in the case of the invention being applied to an encoder, the decoder section of the encoder having to be implemented appropriately): the data stream of a group of pictures begins with header information (GOP header). The data for an I-frame then follow. The first reference frame is reconstructed from these data and these video data are stored in the first reference frame store (reference store). The data for the P-frame follow—if present. Although these data are evaluated, the second reference frame is not immediately reconstructed if B-frames are present, rather those points at which the header information (picture header, slice header) and the macroblock information are located are merely recorded in an access table (ZGT). There must be an entry for every macroblock in the access table.

FIG. 2 shows a simplified block diagram of a decoder with a reduced memory requirement according to the present invention. In this case, it is essential that the data for the second reference frame store (reference store) are kept in a compressed form in the store BSP2, and that access can be made to these data at the slice and macroblock level (the stores BSP2 and BF may in this case be implemented as a physical store). In order to make this possible, the associated addresses must be recorded in an access table. After the analysis of the data for the P-frame, there follow the data for the first B-frame, which is the second frame to be displayed within the group of pictures. The individual macroblocks of the B-frames are, as already described above, reconstructed from the movement-compensated bidirectional interpolation starting from adjacent reference frames and the transmitted prediction error. This means that a block of 16 times 16 pixels which is displaced with respect to the macroblock to be reconstructed must be available in each case from the 1st and the 2nd reference frame (see FIG. 3). Whereas the required video data of the 1st reference frame are already available in the 1st reference frame store BSP1, the corresponding data for the second reference frame store must first be reconstructed. As is evident in FIG. 3, these are generally four macroblocks, the position of which in the reference frame results from the position of the macroblock to be reconstructed in the B-frame and of the associated movement vector. The data necessary for this reconstruction are taken from the store BSP2, and the associated addresses are located in the access table (ZGT). Accordingly, four macroblocks of the 2nd reference frame normally have to be reconstructed in each case in order to reconstruct each macroblock in a B-frame. The reconstructed B-frames are output via the output memory.

Once all of the B-frames between two reference frames have been processed and reproduced, the entire second reference frame is reconstructed anew, on the one hand for the video output and on the other hand so that it can serve as the first reference frame for the next cycle (P B B . . . or I B B). The data for this are initially stored in the memory area which was previously used for the output memory. Since this area is too small to accommodate the entire reference frame (field store), the area which was previously used for the first reference frame in the preceding cycle is subsequently overwritten. The memory area which is no longer required after this reconstruction is used as the output memory for the next frames (see FIG. 4).

The memory area which was previously used for the 1st reference frame store must never be overwritten directly, since the data are still initially required for the reconstruction of the predicted frame. Owing to the movement compensation, it is still possible, even during the reconstruction of a block line lower down, to have recourse to data located at a point which is higher by the maximum value of the vertical component of the movement vector (127 lines D in the case of ISO/IEC 13818-2). This means that this area must always be kept ready, even if the output memory should be reduced still further by other measures.

The invention is not limited to the particular details of the method and apparatus depicted and other modifications and applications are contemplated. Certain other changes may be made in the above described method and apparatus without departing from the true spirit and scope of the invention herein involved. It is intended, therefore, that the subject matter in the above depiction shall be interpreted as illustrative and not in a limiting sense.

What is claimed is:

1. A method for decoding compressed video data with a reduced memory requirement in accordance with the principle of differential pulse code modulation coding with movement-compensated prediction, comprising the steps of:

determining interpolated frames from a chronologically preceding reference frame and a chronologically succeeding reference frame using bidirectional movement-compensated interpolation;

completely decompressing only one first reference frame of the chronologically preceding reference frame and the chronologically succeeding reference frame in order to reconstruct an interpolated frame;

uncompressing only picture areas of the other second reference frame of the chronologically preceding reference frame and the chronologically succeeding reference frame which overlap with a picture area to be determined of the interpolated frame, taking into account displacement corresponding to movement compensation.

2. The method according to claim 1, wherein, for reconstructing and outputting the second reference frame, after the interpolated frames are output, a memory space provided for video output is initially used to store at least part of the second reference frame in an uncompressed form.

3. A method for decoding compressed video data with a reduced memory requirement in accordance with the principle of differential pulse code modulation coding with movement-compensated prediction, comprising the steps of:

determining interpolated frames from a chronologically preceding reference frame and a chronologically succeeding reference frame using bidirectional movement-compensated interpolation;

completely decompressing only one first reference frame of the chronologically preceding reference frame and the chronologically succeeding reference frame in order to reconstruct an interpolated frame;

compressing only picture areas of the other second reference frame of the chronologically preceding reference frame and the chronologically succeeding reference frame which overlap with a picture area to be determined of the interpolated frame, taking into account displacement corresponding to movement compensation;

reconstructing and outputting the second reference frame, after the interpolated frames are output, a memory space provided for video output is initially used to store at least part of the second reference frame in an uncompressed form;

initially using a memory space, provided for the video store, to store at least part of the second reference frame in an uncompressed form for reconstructing and outputting the second reference frame;

using a store, after the message space is used, for the first reference frame to store a remainder of the second reference frame in an uncompressed form;

using a remainder of the store for the first reference frame, which is no longer required, as an output memory for succeeding frames; and the memory area, which has now accommodated the completely uncompressed second reference frame, containing the first reference frame for the decoding of the chronologically succeeding interpolated frames.

* * * * *